Nov. 12, 1929.  L. J. PURDY  1,735,213
METHOD OF ATTACHING FINS TO CYLINDERS
Filed Jan. 4, 1928
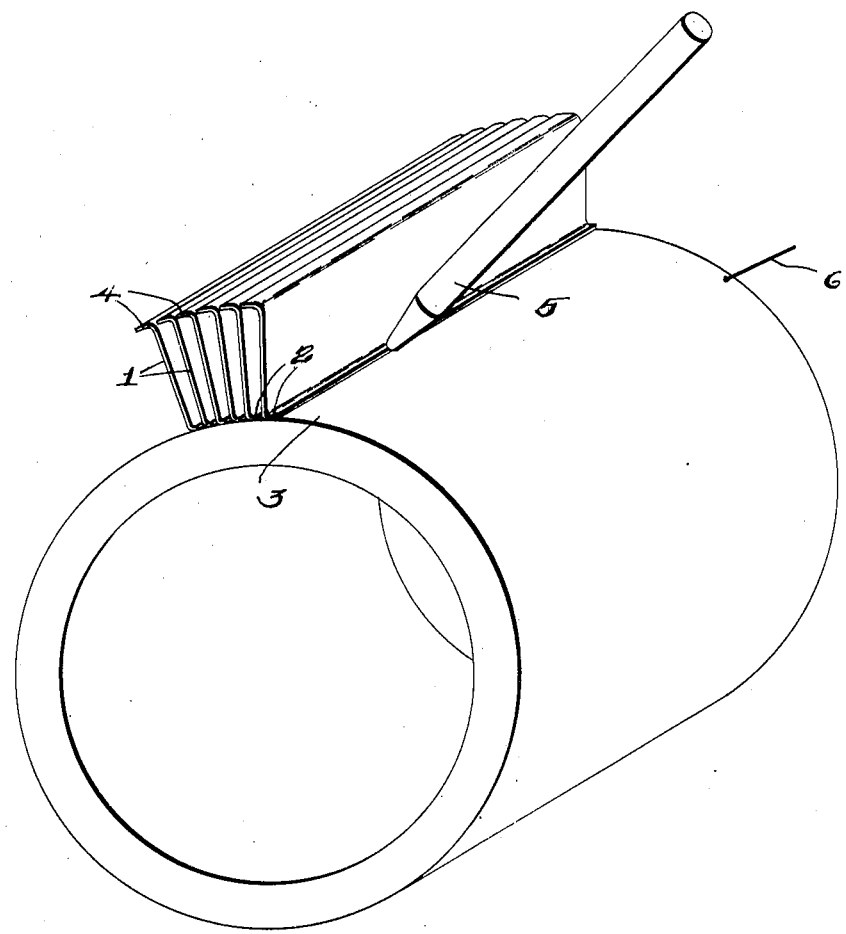
INVENTOR.
Lewis J. Purdy
BY
Parsons & Rodell
ATTORNEYS Patented Nov. 12, 1929

1,735,213

UNITED STATES PATENT OFFICE

LEWIS J. PURDY, OF SYRACUSE, NEW YORK, ASSIGNOR, BY MESNE ASSIGNMENTS, TO FRANKLIN DEVELOPMENT CORPORATION, OF SYRACUSE, NEW YORK, A CORPORATION OF NEW YORK

METHOD OF ATTACHING FINS TO CYLINDERS

Application filed January 4, 1928. Serial No. 244,509.

This invention relates to joining heat radiating fins of a metal having relatively high heat conductivity as copper to a metal body having less heat conductivity as a cast iron cylinder, and has for its object a particularly simple and efficient method for uniting heat radiating fins as copper fins to cast iron cylinders of an internal combustion engine, by which method uniform, good mechanical and heat conducting joints are quickly and economically made.

The invention consists in the novel steps hereinafter set forth and claimed.

In describing this invention, reference is made to the accompanying drawing which is a diagrammatic view illustrating my method of applying fins to cylinders.

This method comprises generally, arranging the fins which are preferably of copper with angular base flanges overlying the finished peripheral surface of the cylinder, and burning the flange on the cylinder by melting the flange and underlying portion of the cylinder by applying the heat to the outer side of the flange until the flange is fused and also, the underlying portion of the cylinder melted or softened so that the metal of the flange runs into the molten metal of the cylinder forming an alloy therewith; thus forming a good mechanical and thermal or heat conducting joint.

The cylinder casting is first rough machined and the peripheral surface to which the fins are to be applied finished by grinding. The fins 1 are joined successively, each being arranged with its base flange 2 overlying the finished peripheral surface 3 of the cylinder.

The flanges here shown are also formed with angular flanges 4 at their outer edges so bent as to form a jacket. The heat is applied by passing a carbon electrode 5 of about one-quarter inch in diameter and tapered to a point, along the outer surface of the flange 2. The other electrode 6 of the electric circuit is connected to the cylinder. The current used is approximately 40 volts at 100 amperes and the carbon electrode is set at about an angle of 45° with the side surface of the fin. That action of this electrode and the arc is a burning in or burning on action rather than a conventional welding action. If desired, a cyanide or said copper plate may be applied to the cylinder of .004 to .006 of an inch, but the plating is not necessary.

A joint or bond made by this process forms a good mechanical and thermal or heat conducting joint, so that in the use of the engine the heat generated in the cylinder is more rapidly and uniformly conducted from the cylinders than by fins attached to the cylinder by casting the cylinder about the margins of the fins on and in the mold with their margin's periphery into the cylinder forming mold cavity or by fins welded to the cylinder by heating the cylinder. The latter method of heating the cylinder has a detrimental annealing effect on the cylinder.

The fins are applied one by one and in applying the last two or three fins, it is necessary to bend the fins out of their radial paths sufficiently to make room for the electrode 5. After the welding is completed, these fins so bent are straightened back to their normal position.

By this process not only are fins attached with perfect thermal and mechanical joints without detrimentally affecting the iron of the cylinder but also the cylinder can be more economically produced than by the methods heretofore employed.

What I claim is:

1. The process of attaching fins to cast iron cylinders consisting in heating angular flanges on the inner edges of the fins and overlying the cylinder wall from the outer sides of the flanges until the flanges are fused and the underlying or local portion only of the cylinder wall melted to less degree and sufficiently to permit the fused fins to run into the pores of the melted cast iron and form an alloy with the underlying local portion of the cylinder.

2. The process of attaching fins having greater conductivity than cast iron to cast iron cylinders consisting in burning the fins on the cylinders by heating angular flanges along the inner edges of the fins and overlying the cylinder wall, by heat applied to the outer side of the flanges until the flanges and the underlying local portion of the cylinder are melted to different degrees of softness.

In testimony whereof, I have hereunto signed my name, at Syracuse, in the county of Onondaga, and State of New York, this 21st day of December, 1927.

LEWIS J. PURDY.